(12) United States Patent
Tahara et al.

(10) Patent No.: US 7,299,187 B2
(45) Date of Patent: Nov. 20, 2007

(54) VOICE COMMAND PROCESSING SYSTEM AND COMPUTER THEREFOR, AND VOICE COMMAND PROCESSING METHOD

(75) Inventors: Yoshinori Tahara, Yamato (JP); Daisuke Tomoda, Yokohama (JP); Kikuo Mitsubo, Yamato (JP); Yoshinori Atake, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 10/361,547

(22) Filed: Feb. 10, 2003

(65) Prior Publication Data

US 2003/0154077 A1 Aug. 14, 2003

(30) Foreign Application Priority Data

Feb. 13, 2002 (JP) ............................. 2002-034973

(51) Int. Cl.
- G06F 17/27 (2006.01)
- G10L 15/00 (2006.01)
- G10L 15/18 (2006.01)
- G10L 21/00 (2006.01)

(52) U.S. Cl. .................... 704/275; 704/9; 704/239; 704/240

(58) Field of Classification Search .............. 704/238, 704/239, 257, 275
See application file for complete search history.

(56) References Cited

U.S. PATENT DOCUMENTS

| | | | | |
|---|---|---|---|---|
| 5,230,023 A * | 7/1993 | Nakano | ...................... | 381/110 |
| 5,255,341 A * | 10/1993 | Nakajima | .................... | 704/200 |
| 5,452,397 A * | 9/1995 | Ittycheriah et al. | ......... | 704/240 |
| 5,566,272 A * | 10/1996 | Brems et al. | ............... | 704/231 |
| 5,684,925 A * | 11/1997 | Morin et al. | ................. | 704/254 |
| 5,852,801 A * | 12/1998 | Hon et al. | ................... | 704/244 |
| 5,899,972 A * | 5/1999 | Miyazawa et al. | .......... | 704/249 |
| 6,064,959 A * | 5/2000 | Young et al. | ............... | 704/251 |
| 6,173,266 B1 * | 1/2001 | Marx et al. | ................. | 704/270 |
| 6,185,530 B1 * | 2/2001 | Ittycheriah et al. | ......... | 704/255 |
| 6,208,972 B1 * | 3/2001 | Grant et al. | ................ | 704/275 |
| 6,587,824 B1 * | 7/2003 | Everhart et al. | ............ | 704/275 |
| 2001/0016813 A1 * | 8/2001 | Brown et al. | ............... | 704/231 |

(Continued)

FOREIGN PATENT DOCUMENTS

JP 08-278794 10/1996

(Continued)

*Primary Examiner*—David Hudspeth
*Assistant Examiner*—Justin W. Rider
(74) *Attorney, Agent, or Firm*—Akerman Senterfitt

(57) ABSTRACT

When a user issued voice command does not match grammars registered in advance, the voice command is identified as a sentence (step S305). This sentence is compared with the registered grammars to calculate a similarity (step S307). When the similarity is higher than a first threshold value (TH1), the voice command is executed (step S315). When the similarity is equal to or lower than the first threshold value (TH1) and higher than a second threshold value (TH2), command choices are displayed for the user and the user is permitted to select a command to be executed (step S319). When the similarity is equal to or lower than the second threshold value (TH2), the command is not executed (step S321). Furthermore, once a command has been executed it is added as a grammar, so that it can be identified when next it is used.

13 Claims, 9 Drawing Sheets

U.S. PATENT DOCUMENTS

2002/0178009 A1 * 11/2002 Firman ................ 704/275

FOREIGN PATENT DOCUMENTS

| JP | 2000-029585 | 1/2000 |
| JP | 2000-242464 | 9/2000 |
| JP | 2000-242494 | 9/2000 |
| WO | WO 98/09228 | 3/1998 |
| WO | WO 02233583 A1 * | 4/2002 |

* cited by examiner

| WORD NO. | WORD | BASEFORM |
|---|---|---|
| . . . . . . . . | . . . . . . . . | . . . . . . . . |
| 00001145 | MOVE | M OW V |
| 00001146 | LINES | L AY N Z |
| 00001147 | CURSOR | K R S R |
| 00001148 | ACTIVE | AE KD T IX V |
| 00001149 | WINDOW | W IH N D OW |
| 00001150 | TWO | T UW OW |
| 00001151 | THREE | TH R IY |
| 00001152 | FOUR | F AO R |
| 00001153 | FIVE | F AY V |
| 00001154 | SIX | S IH K S |
| 00001155 | SEVEN | S EH V AX N |
| 00001156 | EIGHT | EY TD |
| 00001157 | NINE | N AY N |
| 00001158 | FORWARD | F AO R W R DD |
| 00001159 | BACKWORD | B AE K W R DD |
| 00001160 | UPWARD | AH P W R DD |
| 00001161 | DOWNWARD | D AW N W R DD |
| 00001162 | RIGHT | R AY TD |
| 00001163 | LEFT | L EH F TD |
| 00001164 | UP | AH PD |
| 00001165 | DOWN | D AW N |
| 00001166 | CENTIMETERS | S EH N T IX M DX R Z |
| 00001167 | MILLIMETERS | M IH L IX M DX R Z |
| 00001168 | POINTS | P OY N TS |
| 00001169 | BY | B AY |
| 00001170 | THE | TH IY |
| . . . . . . . . | . . . . . . . . | . . . . . . . . |

FIG. 4

```
<command1> =
Move the cursor <number> lines <linedirection>

<command2> =
Move the cursor <direction>
.
<command3> =
Move the <status> window <direction> by <number> <unit>
.
<number> = two
|three
|four
|five
|six
|seven
|eight
|nine
.
<linedirection> = forward
|backward
|upward
|downward
.
<direction> = right
|left
|up
|down
.
<unit> = centimeters
|millimeters
|inches
|points
.
<status> = active
.
```

FIG. 6

| WORD | SIMILAR WORD | SCORE |
|---|---|---|
| ..... | | |
| active | foreground | 0.5 |
| active | current | 0.2 |
| active | in use | 0.2 |
| window | dialogue | 0.5 |
| window | panel | 0.5 |
| dialogue | panel | 0.5 |
| font | character | 0.3 |
| size | area | 0.5 |
| ..... | | |

FIG. 7

| | SIMILARITY $S(W1, W2(j))$ | S>TH1 ? | S>TH2 ? |
|---|---|---|---|
| GRAMMAR $W2_{(1)}$ | 0.36 | NO | NO |
| GRAMMAR $W2_{(2)}$ | 0.67 | NO | YES |
| GRAMMAR $W2_{(3)}$ | 0.87 | NO | YES |

FIG. 8

VOICE COMMAND PROCESSING SYSTEM AND COMPUTER THEREFOR, AND VOICE COMMAND PROCESSING METHOD

CROSS-REFERENCE TO RELATED APPLICATIONS

This application claims the benefit of Japanese Application No. 2002-034973 filed Feb. 13, 2002 at the Japanese Patent Office.

BACKGROUND OF THE INVENTION

1. Technical Field

The present invention relates to a voice command processing system and a computer therefor, and to a voice command processing method and program that improves the recognition ratio for user issued voice commands.

2. Description of the Related Art

Currently, many computer types are employed in diverse locations, and accordingly, various data input means are employed for these computers. Such input means include, for example, keyboards equipped with multiple keys, mice for pointing to arbitrary locations on monitors, touch pads for entering data by running a pen across a photosensitive surface, and speech recognition means for using a microphone to collect and enter as speech data words uttered by a user. Of these input means, the speech input means not only can recognize speech as characters (dictation), but also can understand a voice command issued by a user to enable a predetermined operation of an application. That is, since this speech input means can be used to enter voice commands for a computer or an application, the attention of people is especially drawn to the convenience of its use as input means.

For the recognition of a voice command, the speech of a user entered at a microphone connected to a computer is processed by a voice command recognition program executed by the computer. The voice command is defined using the BN method (Backus-Naur form), which is one of the context description representations for programs executed by the computer. When the voice command recognition program identifies a voice command that exactly matches the grammar of a voice command defined and registered in advance, a designated action is performed. That is, when a user exactly pronounces a voice command registered in advance, a desired action can be initiated.

Since a voice command is defined for each action, however, the possible number of command types are so numerous that it is difficult for a user to exactly memorize and pronounce all voice commands. Further, a user who is not sure of the commands may issue a different, incorrect voice command instead of a correct, registered voice command. Since the word order in a sentence is comparatively changeable, especially in Japanese, a user tends to issue an incorrect voice command, and since the incorrect voice command is not identified as a voice command and is not executed, the user is displeased because even though instructed, a desired action is not initiated.

There is another method used for the advance registration of voice commands that a user will be assumed to issue. According to this method, however, although the number of voice commands to be registered is increased and an extended period of time is allocated for the identification of a voice command, the recognition ratio still can be reduced.

To resolve these technical problems, the primary objective of the present invention is the provision of a voice command processing system that can increase both the degree of freedom for the pronunciation of a voice command by a user, and the recognition ratio for a voice command.

SUMMARY OF THE INVENTION

It is one object of the present invention to provide a voice command processing system that can improve the recognition ratio for a user issued voice command. To achieve this objective, a voice command processing system according to the present invention, for processing a user issued voice command can include registration means for the advance registration of multiple executable commands; acquisition means for obtaining a user issued voice command; determination means for determining which one of the commands registered in the registration means matches the voice command obtained by the acquisition means; and calculation means for, when the determination means ascertains that the voice command does not match any of the registered commands, analyzing the voice command as a sentence, and for calculating, for the registered commands and the sentence, a similarity. According to this invention, since a similarity is calculated, a registered command similar to a voice command can be identified.

The voice command processing system further can include execution instruction means for instructing the execution of a registered command for which the similarity obtained by the calculation means falls within a predetermined range. The voice command processing system also can include request means for, when there are multiple registered commands for which the similarities fall within the first range or when there is one or multiple registered commands for which similarities fall within a second range set lower than the first range, notifying the user of the registered commands, and for requesting that the user determine whether the registered commands should be executed.

The present invention can be implemented as a computer. A computer according to this invention, for executing a user issued voice command, can include a registration unit for registering a command executable by the computer; a voice command processor for accepting a user issued voice command, and for performing a process to execute the voice command; a speech recognition engine for analyzing, as a sentence, the voice command accepted by the voice command processor; and a similarity calculator for comparing the sentence analyzed by the speech recognition engine with the command registered in the registration unit, and for calculating a similarity for the voice command.

The computer according to the invention also can include a data score registration unit for registering phrases similar to the phrases in the command registered in the registration unit, and scores set based on the phrases and the similar phrases. The similarity calculator may employ the scores when calculating the similarity. Further, the voice command processor can execute the registered command when the similarity exceeds a predetermined threshold value.

Furthermore, the present invention can be implemented as a voice command processing method. A voice command processing method according to the invention that permits a computer to perform a user issued voice command can include the steps of accepting a user issued voice command; determining whether the voice command can be identified as a previously registered command; analyzing the voice command as a sentence when it is impossible for the voice command to be identified as a registered command; and comparing phrases in the analyzed sentence with phrases in the registered command in order to calculate a similarity.

The voice command processing method further can include the steps of calculating scores based on matches obtained between phrases in the sentence and phrases in the registered command; and employing the scores to calculate a similarity for the sentence and the registered command. In this case, the voice command processing method further includes a step of registering, as a registered command and in correlation with the sentence, a voice command for which the similarity falls within a predetermined range. In addition, when the similarity falls within the predetermined range, the voice command processing method further includes a step of executing the registered command for which the similarity has been calculated.

Also, the voice command processing method can include a step of at least either when there are multiple registered commands for which similarities fall within the first range, or when there is one or more registered commands for which the similarities fall within a second range, set lower than the first range, displaying for the user the registered commands for which similarities have been obtained, and requesting that the user select a registered command to be executed.

Moreover, a voice command processing method, according to the invention, that permits a computer to execute a user issued voice command can include the steps of analyzing as a sentence a user issued voice command; and comparing the voice command (W1), analyzed as a sentence, with a command (W2) registered in advance to calculate a similarity S(W1,W2), whereby the similarity S(W1,W2) is represented by a value obtained by dividing, by the number (Vn) of applicable words for the calculation of the similarity S(W1,W2), the sum of scores (s) that is based on matching the i-th word (w1(i)) of the voice command and the j-th word (w2(j)) of the registered command. It should be noted that the similarity S(W1,W2) is represented as $\Sigma$ s $(w1_{(i)}, w2_{(j)})$/Vn.

The voice command processing method can further include the steps of executing a registered command when the similarity S(W1,W2) is higher than a first threshold value (TH1); and when the similarity S(W1,W2) is lower than the first threshold value (TH1) and is higher than a second threshold value (TH2) lower than the first threshold value (TH1), displaying the registered command for the user and requesting the user determine whether the registered command should be executed.

In addition, the present invention can also be implemented as a program that permits a computer to execute a voice command issued by a user.

BRIEF DESCRIPTION OF THE DRAWINGS

There are shown in the drawings embodiments which are presently preferred, it being understood, however, that the invention is not limited to the precise arrangements and instrumentalities shown.

FIG. 4 is a diagram showing example data registered in a dictionary.

FIG. 6 is a diagram showing an example grammar registered in a grammar registration unit.

FIG. 7 is a diagram showing example data entered in a score calculation table.

FIG. 8 is a diagram showing the similarities of the grammars relative to a voice command.

DETAILED DESCRIPTION OF THE INVENTION

The preferred embodiment of the present invention will now be described in detail while referring to the accompanying drawings.

Figure 1:
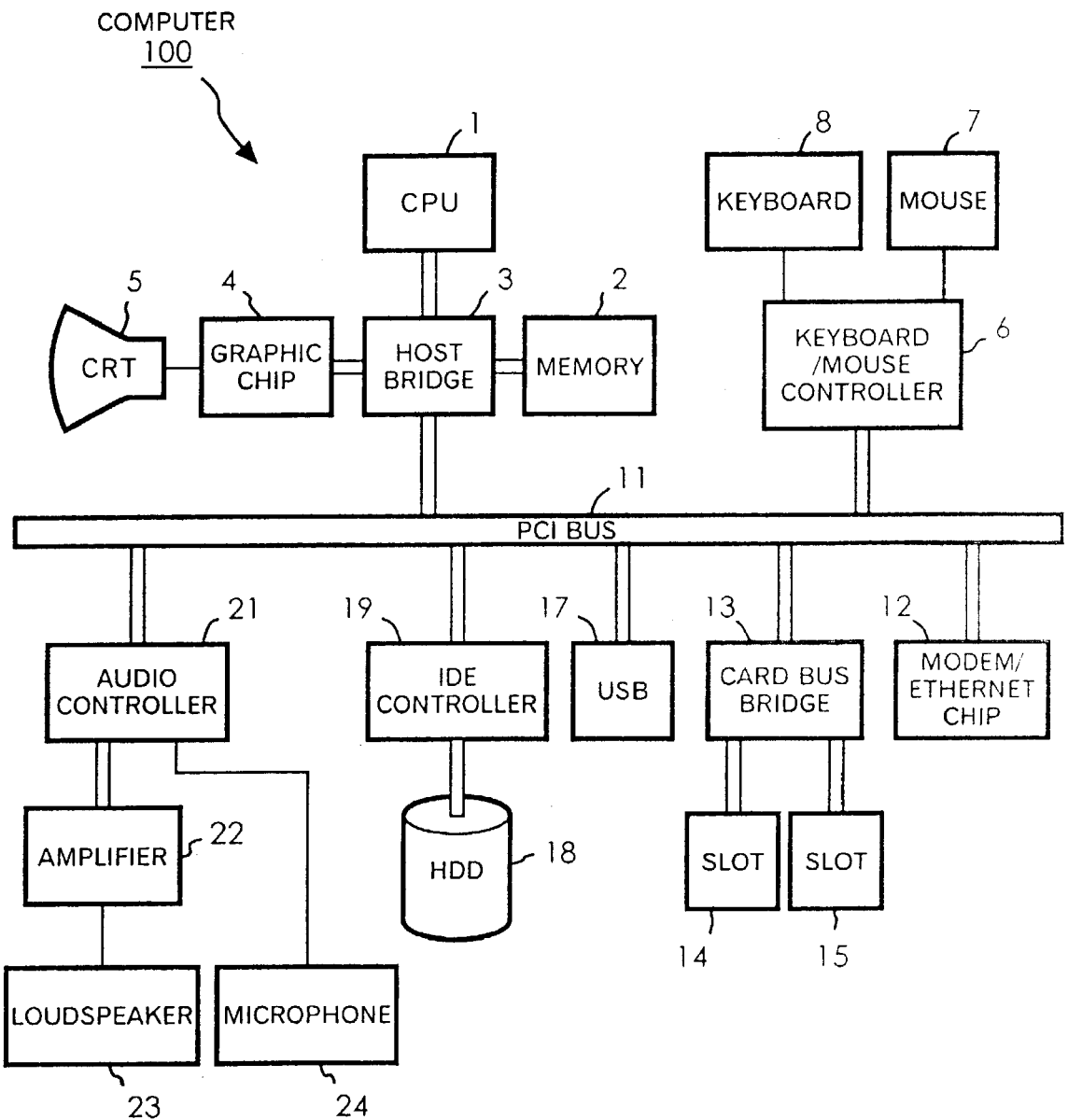
FIG. 1 is a diagram showing the configuration of a computer according to one embodiment of the invention.

FIG. 1 is a diagram showing the configuration of a computer according to the embodiment of the present invention. A computer 100 in FIG. 1 incorporates a predetermined OS (Operating System) conforming with the OADG (Open Architecture Developer's Group) specifications. The computer 100 includes a CPU (Central Processing Unit) 1, a memory 2 and a graphic chip 4 for processing images, all of which are connected to a CPU bus 11 across a host bridge 3. A CRT (display) 5 is also connected, through the graphics chip 4, to the computer 100 as a data output means in order to present image data to a user.

The computer 100 includes a keyboard/mouse controller 6 connected to the PCI bus 11. And for entering screen location data, a mouse 7 and a keyboard 8 for supporting a key entry are connected as data input means to the computer 100 through the keyboard/mouse controller 6.

The computer 100 further includes: a modem/ethernet chip 12 for connecting with an external network; a card bus bridge 13, for which slots 14 and 15 are provided for loading a MO (Magneto Optical) or a CD-ROM, for example; a USB (Universal Serial Bus) 17 for connecting an external device; and an IDE controller 19, for which an HDD 18 is provided, all of which are connected to the PCI bus 11. The computer 100 further includes an audio controller 21, connected to the PCI bus 11, for processing a speech signal, and an amplifier 22, connected to the audio controller 21. In addition, as one input means, a microphone 24 for collecting external sounds is connected to the computer 100 through the audio controller 21. A loudspeaker 23 is also connected to the computer 100 to output as sound an audio signal received from the audio controller 21.

The computer 100 can be implemented by a common personal computer (PC), a workstation, a computer incorporated in an electric product, such as a television or a facsimile machine, a computer such as a navigation system mounted in a ground vehicle or in an airplane, or any combination thereof. Since the components shown in FIG. 1 are merely examples, and since the present invention relates to the specification of a voice command and character data, not all components in FIG. 1 are requisite, and components other than those shown may also be included.

The operating system (OS) of the computer 100 can be one such as Windows (a trademark of Microsoft Corp.), OS/2 (a trademark of IBM Corp.) or MacOS (a trademark of Apple Inc.) that supports as a standard a GUI, multi-window environment, a character-based OS such as DOS, a real-time OS such as VxWorks (a trademark of Wind River Systems, Inc.) or another OS mounted in a network computer. In any case, the OS of computer 100 is not limited to a specific operating system.

Figure 2:
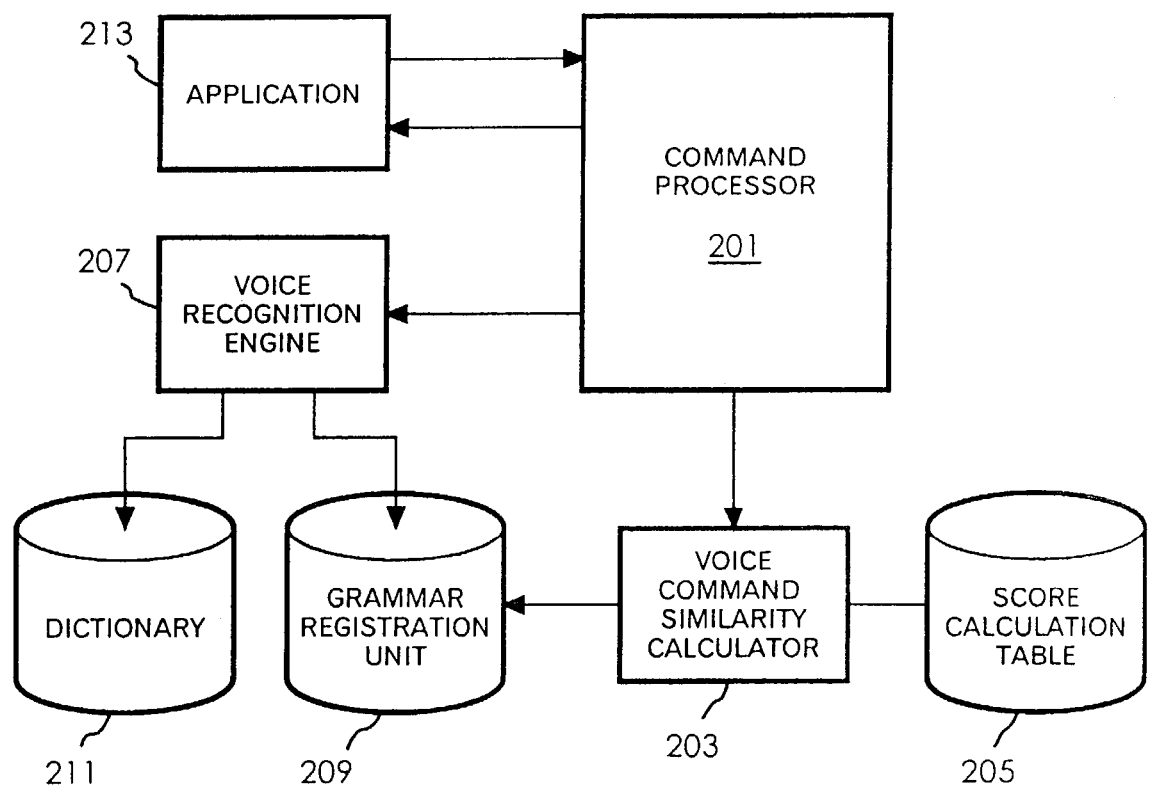
FIG. 2 is a functional block diagram showing the components of a voice command processing system for the computer.

FIG. 2 is a functional block diagram showing the components of a voice command processing system for the computer 100. The voice command processing system in FIG. 2 includes a command processor 201, a voice command similarity calculator 203, a score calculation table (score data registration unit) 205, a voice recognition engine 207, a grammar registration unit 209, a dictionary 211, and an application 213.

The command processor 201 obtains command data from the application 213, and employs a similarity received from the voice command similarity calculator 203 to specify a command to be executed. The voice command similarity calculator 203 employs the score calculation table 205 to calculate a similarity for a sentence in a recognized voice command and the grammar of a command registered in the grammar registration unit 209. The voice recognition engine 207 analyzes speech data using the dictionary 211, and outputs a sentence as a speech recognition character string. The grammar registration unit 209 registers an executable command as a grammar, and words used for the voice command are registered in the dictionary 211.

The application 213 need only be software, such as a word processor, presentation software or a Web browser, that can handle character data, or software that can manage image data that can be converted into character data. The application 213 also executes a designated command upon receiving a request from the command processor 201.

The functional blocks in FIG. 2 are logical functional blocks, and can be implemented by a combination of hardware and software blocks or by hardware and software blocks used in common, instead of by independent hardware or software blocks.

The thus arranged computer 100 identifies a user issued voice command in order to perform a predetermined operation in the application 213, and executes an action designated by the voice command. The voice command is a voice instruction to execute a predetermined OS operation or the application provided for the computer 100. In this embodiment, even when the voice command issued by a user does not completely match the grammar registered in advance in the grammar registration unit 209, the voice command can be executed by referring to how well the voice command matches the registered grammar (the similarity). This voice command recognition system will now be described in detail.

Figure 3:
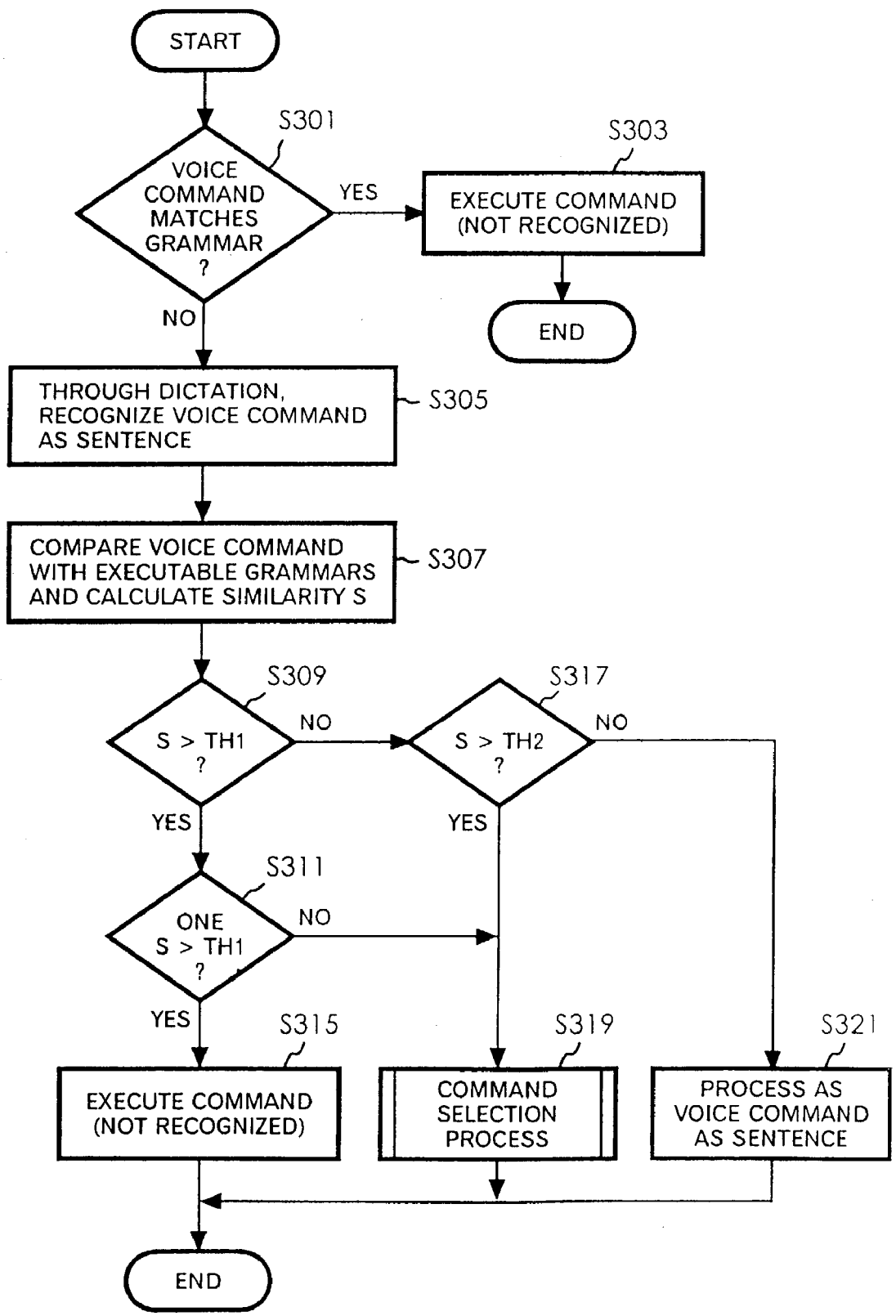
FIG. 3 is a diagram for explaining the processing performed by the voice command processing system.

FIG. 3 is a flowchart for explaining the processing performed by the voice command processing system. First, the computer 100 determines whether a voice command issued by a user matches grammars registered as executable commands in the grammar registration unit 209 (step S301). Specifically, the user issued voice command is input at the microphone 24, and is compared by the command processor 201 with the executable grammars registered in the grammar registration unit 209 to determine whether it matches one of the grammars.

When it is ascertained at step 301 that the voice command matches one of the registered grammars, the command is executed by the application 213 (step S303) and the processing is terminated.

When it is ascertained at step S301 that the voice command issued by the user does not match any of the grammars, the recognition process for the sentence of the voice command is performed using a dictation process (step S305). The dictation process is one wherein the speech recognition engine 207 examines the dictionary 211 to extract words having readings that match those of words in the voice command, and identifies the speech as characters. Words, readings, and pronunciations are registered in the dictionary 211 in FIG. 4, and next, the command processor 201 transmits to the voice command similarity calculator 203 a sentence (W1) identified at step S305, and matches it with the executable grammars to calculate the similarity S (step S307). The calculation of the similarity S by the voice command similarity calculator 203 will now be specifically described.

Figure 5:
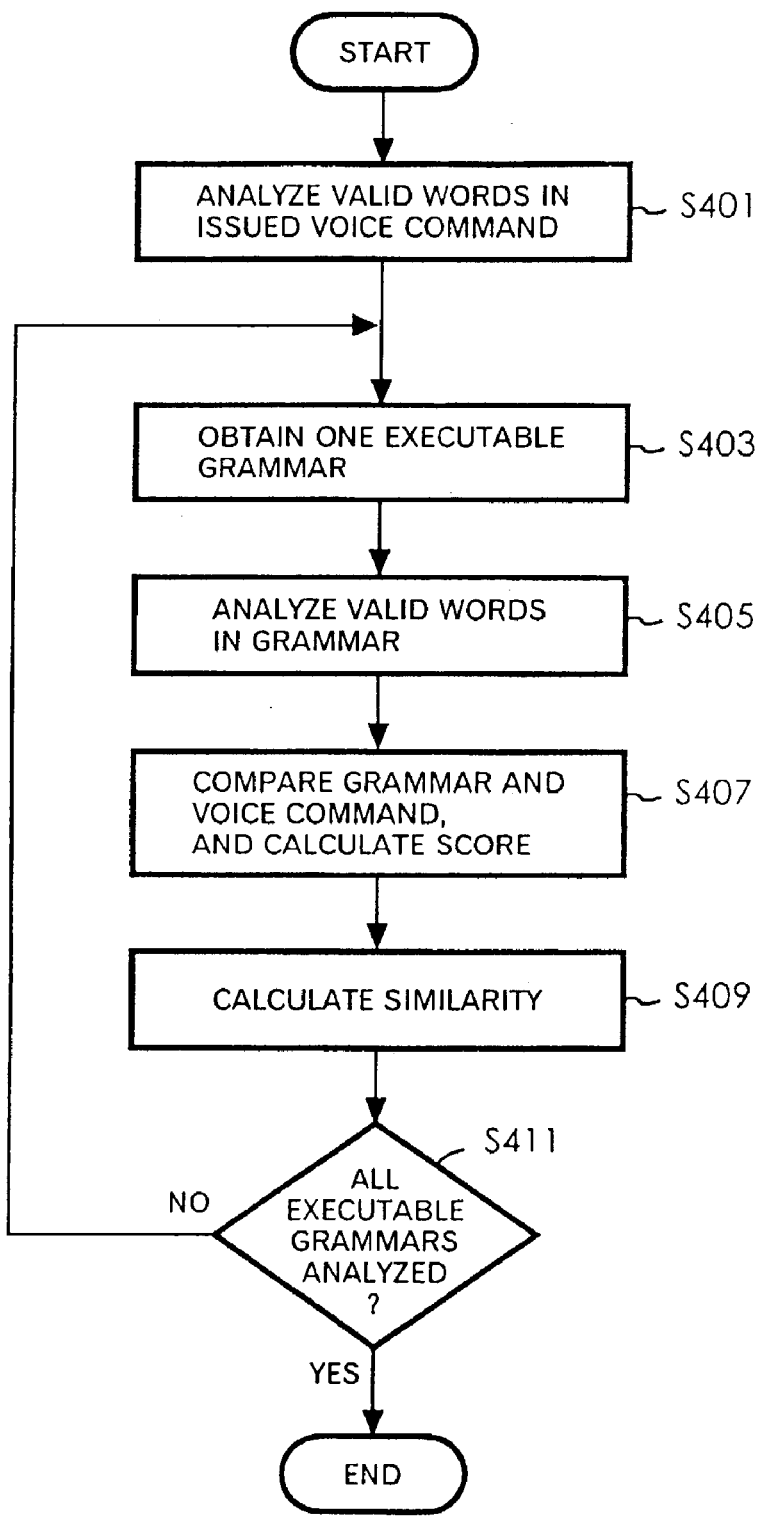
FIG. 5 is a flowchart showing the similarity calculation processing.

FIG. 5 is a flowchart for explaining the processing for calculating a similarity. First, for the sentence (W1) obtained by recognition through dictation at step S305, the voice command similarity calculator 203 analyzes valid words that are applicable for calculation of the similarity (step S401). An explanation will be given by using an example wherein, as the recognition results obtained through dictation, the following sentence (voice command (W1)) is obtained as a user issued voice command: (W1) "Move the current window ten centimeters to the right."

At step S401, words are delimited for each phrase of this voice command (W1), and the types of parts are specified for these words. The analysis results obtained for the voice command (W1) are shown below. The underlined words (words other than postpositionals in this case) represent words that are determined to be applicable for calculation of the similarity.

(W1); results of the analysis of "Move the current window ten centimeters to the right":

Move . . . <operation>
the . . . <postpositional>
current . . . <status>
window . . . <entry>
ten . . . <numeral>
centimeters . . . <unit>
to . . . <postpositional>
the . . . <postpositional>
right . . . <direction>

Following step S401, the voice command similarity calculator 203 employs the information received from the application 213 through the command processor 201 to obtain one of the grammars registered in the grammar registration unit 209 and executable by the application 213 (step S403). An example grammar registered in the grammar registration unit 209 is shown in FIG. 6. It should be noted, however, that the one shown in FIG. 6 is merely one of the registered grammars, and many others can be registered. Further, while the grammar in FIG. 6 is defined using the BN method, another method may be employed. An example grammar ($W2_{(1)}$) obtained at step S403 is as follows: $W2_{(1)}$; Move the cursor <number 1-9> line <forward, backward, upward, downward>".

Next, as for the voice command (W1), the grammar $W2_{(1)}$ obtained at step S403 is analyzed to find applicable words for the similarity calculation (step S405). The analysis results for the grammar $W2_{(1)}$ are shown below.

The analysis results for $W2_{(1)}$; Move the cursor <number 1-9> line <forward, backward, upward, downward>", are:

Move . . . <operation>
the . . . <postpositional>
cursor . . . <entry>
<number 1-9>. . . <numeral>
line . . . <unit>
<forward, backward, upward, downward>. . . <direction>

Following step S405, the words in the voice command (W1) issued by the user are compared with the words in the grammar ($W2_{(1)}$), and the score for each word combination is calculated (step S407). First, specifically for the similarity calculations, applicable words in the voice command (W1) are combined with the same type of words in accordance with the sentence word order. For example, the word pertinent to <number> in the voice command (W1) is combined with a word pertinent to <number> in the grammar (W2$_{(1)}$), and a score is calculated for the thus obtained combination. This process is repeated for all the words, and subsequently, the matching of words is performed without taking into account the word order in the voice command (W1) and the grammar (W2$_{(1)}$). The score is calculated.

The calculation, at step S407, of the score for the matched words is performed by referring to data registered in a score calculation table 205, and is based on a score calculation method that will be described below. For example, on the assumption $0 \leq s \leq 1$, score (s) is specified to determine which of the following categories is pertinent to each word in the voice command (W1). In this case, since the word similarity is high, a high score is set.

The following illustrates the score calculation method:

word completely matching a word designated by the grammar . . . 1.0;

word defined as a variable by the grammar and matching the variable . . . 0.9;

word matching "similar words" in the score calculation table 205 . . . score point designated in the score calculation table 205;

word for which the location, from the beginning of the sentence, matches the grammatical word order, even though the word, as a word, is not matched . . . 0.1; and word that does not correspond to any of the above categories . . . 0.

Example data registered in the score calculation table 205 are shown in FIG. 7. As is shown in FIG. 7, scores are registered in the score calculation table 205 for words that are similar to predetermined words. Assuming that a word in the user issued voice command is related to "active" in the grammar, and that this word is related to one of the similar words in FIG. 7, the numerical value entered in the next right column is defined as a score. It should be noted that these scores can be changed as needed.

An explanation will now be given for the score (s) that is obtained for each entry in the voice command (W1) and the grammar (W2$_{(1)}$) by referring to the score calculation table 205. When multiple combinations are expected for a single word, the score finally obtained is the highest of those obtained for all the combinations. The results of the score (s) are shown in the order <type>: S(entry of W1; entry of W2$_{(1)}$).

Score results (s) for the voice command (W1) and the grammar (W2$_{(1)}$);

<numeral>: s (10; <number 1-9>)=0.1

<unit>: s (centimeters; line)=0.2

<direction>: s (right; <forward, backward, upward, backward>)=0.4

<entry>: s (window; cursor)=0.1

<operation>: s (move; move)=1.0

Then, as is shown in FIG. 5, based on these scores, the similarity S(W1,W2) is calculated using equation (1) (step S409).

$$S(W1, W2) = \Sigma s(w1_{(i)}, w2_{(j)})/Vn \quad (1)$$

wherein the terms in equation (1) are as follows:

$w1_{(i)}$ . . . the i-th word of the issued voice command ($1 \leq i \leq m$)

$w2_{(j)}$ . . . the j-th word of the issued voice command ($1 \leq j \leq n$)

W1 . . . voice command that was issued

W2 . . . grammar to be compared

Vn . . . the number of applicable words for similarity calculation

As a result, between the voice command (W1) and the grammar (W2$_{(1)}$), the similarity S(W1,W2$_{(1)}$) is (0.1+0.2+0.4+0.1+1.0)/5=0.36.

In this embodiment, the scores obtained at step S407 are employed for the calculation of the similarity S; however, the weighting may be performed in accordance with the types of words used to calculate the similarity S. For example, since <entry>, which can serve as the subject, tends to affect the meaning of the command, the similarity S can also be calculated while weighting is performed to increase the <entry> score.

Following step S409, a check is performed to determine whether all the executable grammars registered in the grammar registration unit 209 have been analyzed (step S411). Specifically, the voice command (W1) is combined with each executable grammar, and the process at steps S405 to S409 in FIG. 5 is performed for each of these grammars. When all the grammars have been analyzed, this processing is terminated, and the process at step S309 in FIG. 3, which will be described later, is performed.

When at step S411 not all the grammars have been analyzed, program control returns to step S403, one of the executable grammars is extracted, and the process is repeated. A specific explanation will now be given for an example wherein, following the completion of the processing performed for grammar (W2$_{(1)}$), the same processing is performed for grammars (W2$_{(2)}$) and (W2$_{(3)}$), which have been analyzed relative to the voice command W1, and the similarity S is calculated. The processes performed at steps S403 to S409 are the same as those performed for the grammar (W2$_{(1)}$), and no detailed explanation will be given for them.

Analysis results obtained at step S407 for (W2$_{(2)}$) "Move the cursor <left, right, up, down>";

Move . . . <operation> the . . . <postpositional> cursor . . . <entry>

<left, right, up, down>. . . <direction>

Scores (s) between the voice command (W1) and the grammar (W2$_{(2)}$) obtained at step S407:

<entry>: s (window; cursor)=0.1

<direction>: s (right, <forward, backward, upward, downward>)=0.9

<operation>: s (move, move)=1.0

Similarity S(W1,W2$_{(1)}$) between the voice command (W1) and the grammar (W2$_{(2)}$) obtained at step S409: (0.1+0.9+1.0)/3=0.67.

Analysis results at step S405 for (W2$_{(3)}$) "Move the active window <left, right, up, down> by <number> <unit>;

Move . . . <operation> the . . . <postpositional> active . . . <status> window . . . <entry>

<left, right, up, down>. . . <direction> by . . . <postpositional>

<number>. . . <numeral>

<unit>. . . <unit>

Scores (s) obtained between the voice command (W1) and the grammar (W2$_{(3)}$) obtained at step S407:

<status>: s (current; active)=0.5

<entry>: s (window; window)=1.0

<numeral>: s (10; <number>)=0.9

<unit>: s (centimeter; <unit>)=0.9

<direction>: s (right; <left, right, up, down>)=0.9
<operation>: s (move; move)=1.0

Similarity $S(W1,W2_{(3)})$ between the voice command (W1) and the grammar $(W2_{(3)})$ obtained at step S409: (0.5+1.0+0.9+0.9+0.9+1.0)/6=0.87.

In this manner, the voice command similarity calculator 203 calculates the similarity S for the voice command relative to each executable grammar, and when at step S411 all the executable grammars have been analyzed, the process at step S309 in FIG. 3 is performed. In order to simplify the explanation, analyzation is performed for only the three executable grammars $(W2_{(1)})$, $(W2_{(2)})$ and $(W2_{(3)})$; however, since actually all the executable grammars are analyzed, the similarity S is calculated for each of multiple grammars.

Next, the command processor 201 determines whether, among the similarities S obtained at step S307 between a single voice command (W1) and multiple grammars $(W2_{(1)})$, $(W2_{(2)})$, $(W2_{(3)})$, ... there is a similarity higher than a first predetermined threshold value (TH1) (step S309). It should be noted that the first threshold value (TH1) is 0.9, for example. The similarities S for the grammars $(W2_{(1)})$, $(W2_{(2)})$, and $(W2_{(3)})$ are those shown in FIG. 8, none of which is higher than the first threshold value (TH1), 0.9. When no grammar has a similarity S higher than the first threshold value, the process at step S317, which will be described later, is performed.

When it is ascertained at step S309 that there is a similarity S higher than the first threshold value (TH1), a check is performed to determine whether there is only one (step S311). When there is only one, the execution of a command designated by the grammar $(W2_{(x)})$ having this similarity S is transmitted to the application 213, which executes the command (step S315). Thereafter, the processing is terminated. But when it is ascertained at step S311 that at least two similarities S are higher than the first threshold value (TH1), i.e., when there are multiple executable grammars having similarities S higher than the first threshold value (TH1), the process at step S319, which will be described later, is performed.

When at step S309 among the similarities S of the single voice command (W1) relative to multiple grammars, there is no similarity S higher than the first threshold value (TH1), a check is performed to determine whether there is a similarity S higher than a second threshold value (TH2), which is a lower limit value set lower than the first threshold value (TH1) (step S317). In this case, the second threshold value is, for example, 0.5. When there is no similarity S higher than the second threshold value (TH2), i.e., when the similarities S of all the grammars are equal to or lower than the second threshold value, the voice command is handled as a normally input sentence (step S321) and the processing is thereafter terminated. When at step S317 there are similarities S higher than the second threshold value, e.g., when as is shown in FIG. 8 there are grammars $(W2_{(2)})$ and $(W2_{(3)})$, the similarities S of which are higher than the 0.5 second threshold value (TH2), the command selection process is performed (step S319) and this processing is terminated.

In this embodiment, only two threshold values are provided; however, the number is not limited to two, and the number of threshold values to be provided and their numerical values are variable in accordance with an arbitrary processing speed or accuracy. Further, an arbitrary determination reference, such as "a value higher than a predetermined threshold value" or "a value equal to or higher than a predetermined threshold value, can be employed. In short, at steps S309, S311, and S317 of this invention, whether the similarity falls within a predetermined range, and different processes are preformed in accordance with the results.

Figure 9:
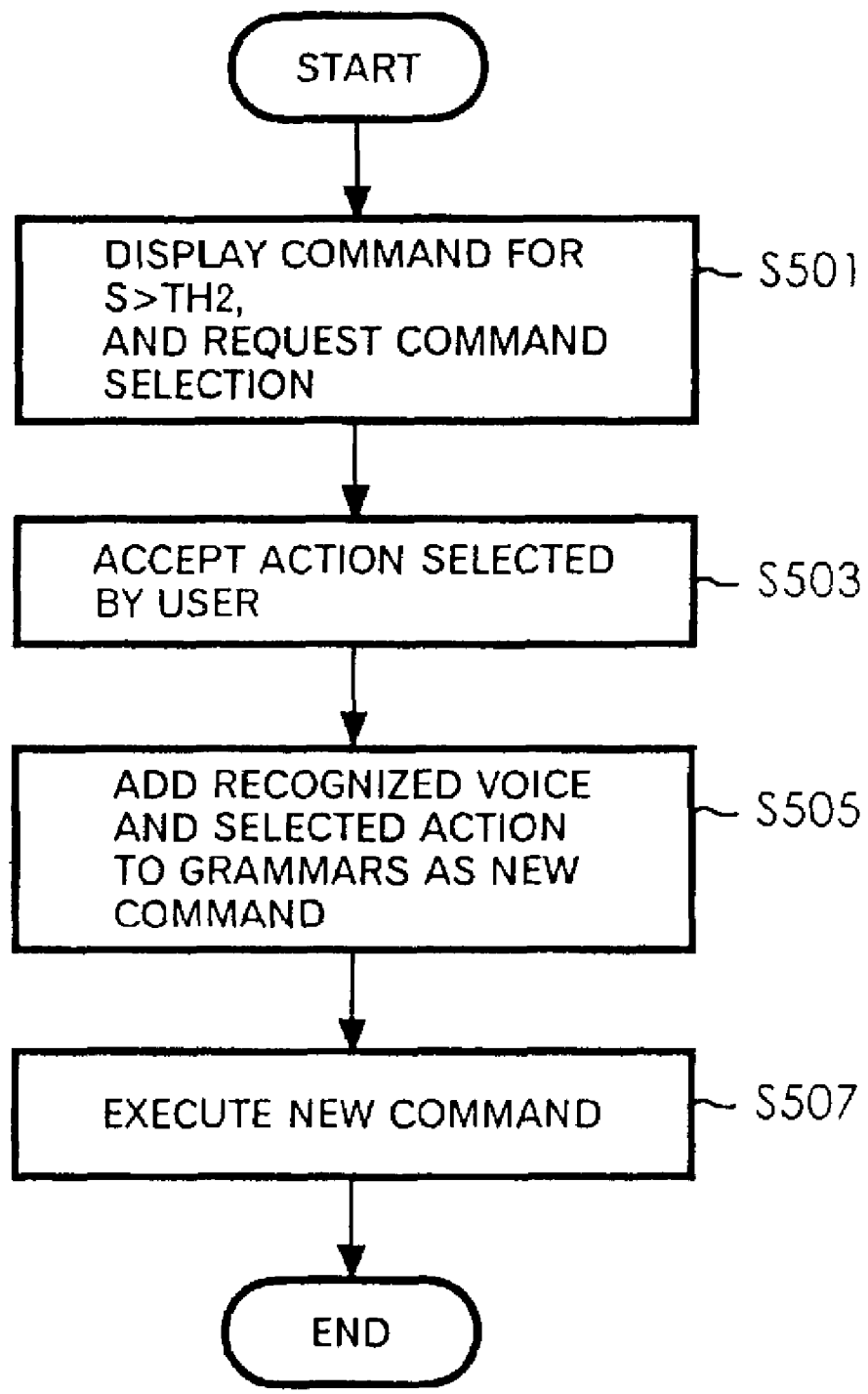
FIG. 9 is a flowchart showing the command selection processing.

FIG. 9 is a flowchart for explaining the command selection processing at step S319.

Figure 10:
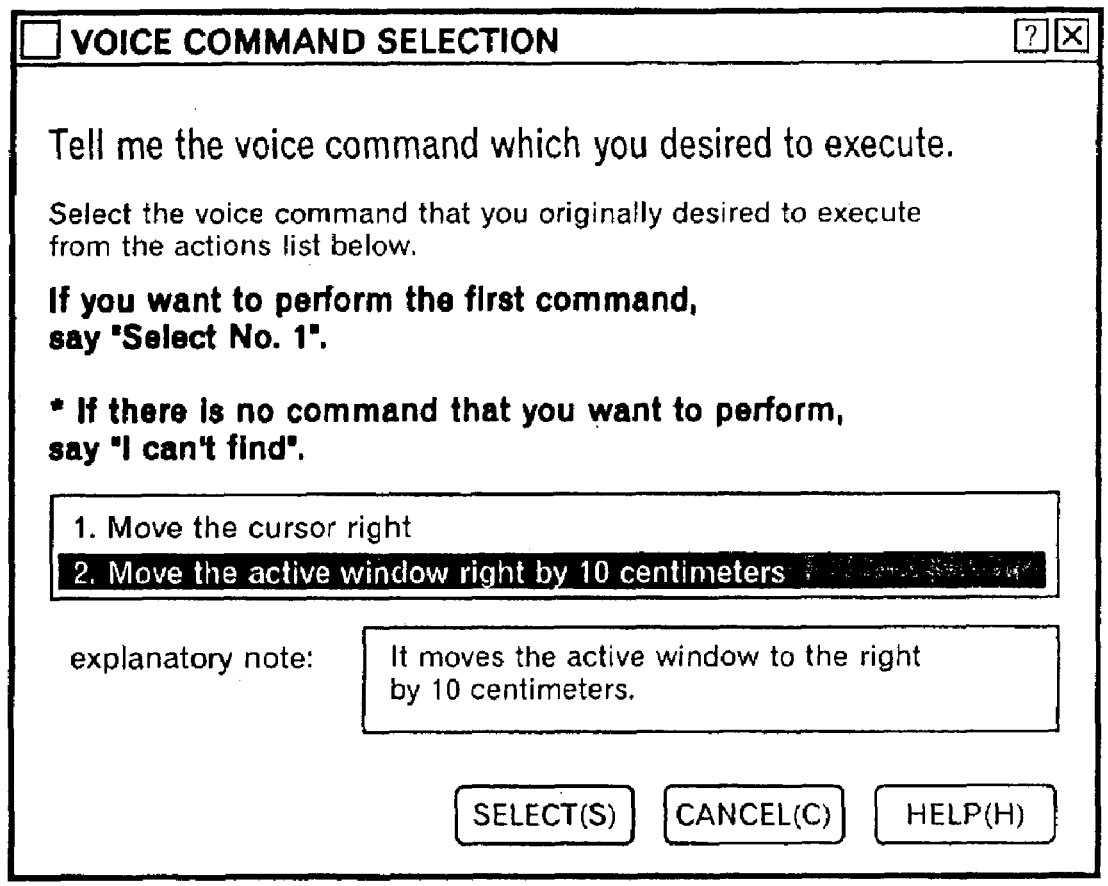
FIG. 10 is a diagram showing an example screen for requesting a user grammar selection.

First, the grammars $(W2_{(2)})$ and $(W2_{(3)})$, found at step S317 in FIG. 3 to have similarities S higher than the second threshold value (TH2), are displayed for the user, and a request is issued to the user to select a grammar as a command to be executed (step S501). In this embodiment, a screen shown in FIG. 10 is displayed on the CRT 5 connected to the computer 100. As is shown in FIG. 10, the grammars $(W2_{(2)})$ and $(W2_{(3)})$ having similarities S higher than the second threshold value (TH2) are displayed on the screen, so that the user can employ the mouse 7 or the keyboard 8 to select the grammar pertinent to the command that the user originally desired to execute. The command processor 201 accepts the grammar selected by the user (step S503).

Then, the command processor 201 correlates the grammar accepted at step S503 with the voice command that the user originally issued, and registers the accepted grammar as a new one in the grammar registration unit 209 (step S505). The newly registered grammar is then executed (step S507) and this processing is thereafter terminated.

This new grammar registered in the grammar registration unit 209 is not the original voice command issued by the user, but a grammar that can also be identified even when the command is replaced with predetermined words by the BN method.

An explanation will be given for an example wherein the voice command (W1) issued by the user is "Move the current window ten centimeters to the right", while the user selects on the screen in FIG. 10 "Move the active window ten centimeters to the right" $(W2_{(3)})$. At this time, <command3> shown in FIG. 6 is already registered in the grammar $(W2_{(3)})$ in the grammar registration unit 209. <command3> is changed to the following command. In this case, the already registered grammar is connected to a newly added grammar by "or", and words "the current" is added as the <status> definition. "<command3>=Move the <status> window <direction> by <number> <unit>" and "<status>=active|. . . |current".

As is described above, the voice command processing system in this embodiment can execute the voice command issued by a user when the similarity of this command relative to the grammars already registered is high even when the command does not completely match them. Therefore, the user need not remember all the voice commands exactly, and those occasions when the user feels displeased because the voice command is not identified can be reduced.

In addition, since the voice command of the user is registered in correlation with the already registered grammar, i.e., when the grammar is reconstructed, the variety of the voice commands that can be handled can be expanded. Furthermore, since by using this method the voice command of the user is not registered unchanged, the amount of registered grammars is not drastically increased, and the accuracy (recognition ratio) for the recognition of the voice command is not deteriorated much. Moreover, since the variation of the grammars registered in advance is reduced at the initial setup of the voice command processing system, and commands matching the user's tastes can be newly added, the usability is increased for each user.

The program for performing the processing in this embodiment can be implemented as a storage medium or a program transmission apparatus as follows. That is, the program executed by the computer need only be stored on a computer-readable storage medium, such as a CD-ROM, a DVD, a memory, or a hard disk. Furthermore, the program transmission apparatus need only include storage means, such as a CD-ROM, a DVD, a memory or a hard disk, for storing the program; and transmission means for reading this program from the storage means and transmitting this program to a program execution apparatus via a connector or a network, such as a LAN.

In addition, without departing from the scope of the invention, the configuration of this embodiment can be selectively changed or modified, as needed, to obtain another configuration.

As is described above, according to the invention, the voice command recognition ratio can be improved by this voice command processing system.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A voice command processing system, for processing a user issued voice command, comprising:
   registration means for the advance registration of multiple executable commands;
   acquisition means for obtaining said user issued voice command;
   determination means for determining whether one of said executable commands registered in said registration means matches said user issued voice command obtained by said acquisition means;
   execution means for executing one of said registered commands if performing a process to execute said user issued voice command matches one of said grammars;
   calculation means for, when said determination means ascertains that said voice command does not match any of said registered executable commands, analyzing said voice issued command as a dictated sentence, and calculating for said registered commands and said sentence a similarity, wherein said similarity is based on a comparison of a reading of words in said sentence analyzed with a reading of words in said registered executable command; and
   request means for when there are multiple registered executable commands for which the similarities fall above a first threshold, notifying said user of said registered executable commands, and requesting that said user determine whether said registered commands for which the similarities fall above said first threshold should be executed.

2. The voice command processing system according to claim 1, further comprising:
   execution instruction means for instructing the execution of a registered executable command for which said similarity obtained by said calculation means falls within a predetermined range.

3. The voice command processing system according to claim 1, further comprising:
   request means for, when there is one or multiple registered commands for which similarities fall between the first threshold and a second threshold lower than the first threshold, notifying said user of said registered commands for which similarities fall between the first and the second threshold, and requesting that said user determine whether said registered commands for which similarities fall between the first and the second threshold should be executed.

4. A computer, for executing user issued voice commands, comprising:
   a grammar registration unit for registering one or more commands executable by said computer as grammars;
   a command processor for accepting a user issued voice command and for executing one of said registered commands if said user issued voice command matches one of said grammars;
   a voice recognition engine for analyzing, as a dictated sentence, said user issued voice command accepted by said command processor when it is impossible for said accepted voice command to be matched to one of said grammars;
   a voice command similarity calculator for comparing a reading of words in said sentence analyzed by said voice recognition engine to a reading of words in each of said commands registered in said grammar registration unit, and calculating for said voice command a similarity to each of said registered commands; and
   a score data registration unit for registering words having a reading similar to the reading of the words in each of said registered commands and a score for each of said similar reading words based on a similarity of the reading of said words in said registered command and said similar reading words;
   wherein said voice command similarity calculator employs said scores when calculating said voice command similarity.

5. The computer according to claim 4, wherein said voice command processor executes said registered command when said similarity exceeds a predetermined threshold value.

6. A voice command processing method that permits a computer to perform a user issued voice command comprising the steps of:
   accepting a user issued voice command;
   determining whether said voice command can be identified as a previously registered command for an operation;
   analyzing said voice command as a dictated sentence when it is impossible for said accepted voice command to be identified as a previously registered command for an operation;

calculating a score for each word in said sentence based on a similarity of the reading of said each word in said sentence and words in a previously registered command for an operation;

employing said scores to calculate a similarity for said sentence relative to said previously registered command; and registering, as a new registered command for said operation and in correlation with said sentence, said accepted voice command if said similarity falls within a predetermined range.

7. The voice command processing method according to claim 6, further comprising the step of:

when said similarity falls within said predetermined range, executing said registered command for which said similarity has been calculated.

8. The voice command processing method according to claim 6, further comprising the steps of:

at least either when there are two or more registered commands for which similarities fall above a first threshold, or when there are one or more registered commands for which said similarities fall between said first threshold and a second threshold, set lower than said first threshold, displaying for said user said registered commands for which similarities have been obtained, and requesting that said user select a registered command to be executed.

9. A voice command processing method that permits a computer to execute a user issued voice command comprising the steps of:

determining that the user issued voice command cannot be identified as an executable command registered (W2) in advance;

analyzing as a dictated sentence said user issued voice command;

comparing said analyzed user issued voice command (W1) with the registered command (W2) to calculate a similarity S(W1,W2);

if said similarity S(W1,W2) is higher than a first threshold value (TH1), executing the registered command (W2); and if said similarity S(W1,W2) is lower than said first threshold value (TH1) and higher than a second threshold value (TH2) lower than said first threshold value (TH1), displaying said registered command (W2) for said user and requesting said user determine whether said registered command (W2) should be executed, whereby said similarity S(W1,W2) is represented by a value obtained by dividing, by the number (Vn) of applicable words for the calculation of said similarity S(W1,W2), a sum of scores (s) that is based on a similarity of a reading of the i-th word (w1(i)) of said voice command and the j-th word (w2(j)) of said registered command (W2).

10. A machine readable storage, having stored thereon a computer program having a plurality of code sections executable by a machine for causing the machine to perform the steps of:

accepting a user issued voice command;

determining whether said voice command can be identified as a previously registered command for an operation;

analyzing said voice command as a dictated sentence when it is impossible for said accepted voice command to be identified as a previously registered command for an operation;

calculating a score for each word in said sentence based on a similarity of the reading of said each word in said sentence and words in a previously registered command for an operation;

employing said scores to calculate a similarity for said sentence relative to said previously registered command; and registering, as a new registered command for said operation and in correlation with said sentence, said accepted voice command if said similarity falls within a predetermined range.

11. The machine readable storage of claim 10, further causing the machine to perform the step of:

when said similarity falls within said predetermined range, executing said registered command for which said similarity has been calculated.

12. The machine readable storage of claim 10, further causing the machine to perform the steps of:

at least either when there are two or more registered commands for which similarities fall above a first threshold, or when there are one or more registered commands for which said similarities fall between said first threshold and a second threshold, set lower than said first threshold, displaying for said user said registered commands for which similarities have been obtained, and requesting that said user select a registered command to be executed.

13. A machine readable storage, having stored thereon a computer program having a plurality of code sections executable by a machine for causing the machine to perform the steps of:

determining that the user issued voice command cannot be identified as an executable command registered (W2) in advance;

analyzing as a dictated sentence said user issued voice command; and comparing said analyzed user issued voice command (W1) with the registered command (W2) to calculate a similarity S(W1,W2);

if said similarity S(W1,W2) is higher than a first threshold value (TH1), executing the registered command (W2); and if said similarity S(W1,W2) is lower than said first threshold value (TH1) and higher than a second threshold value (TH2) lower than said first threshold value (TH1), displaying said registered command (W2) for said user and requesting said user determine whether said registered command (W2) should be executed, whereby said similarity S(W1,W2) is represented by a value obtained by dividing, by the number (Vn) of applicable words for the calculation of said similarity S(W1,W2), the sum of scores (s) that is based on a similarity of a reading of the i-th word (w1(i)) of said voice command and the j-th word (w2(j)) of said registered command (W2).

* * * * *